Dec. 19, 1950 T. H. BARTH 2,534,397
SYNCHRONIZING BOMB SIGHT
Filed April 5, 1935 12 Sheets-Sheet 1

Inventor:
T. H. Barth
by Harold Dodd
Attorney

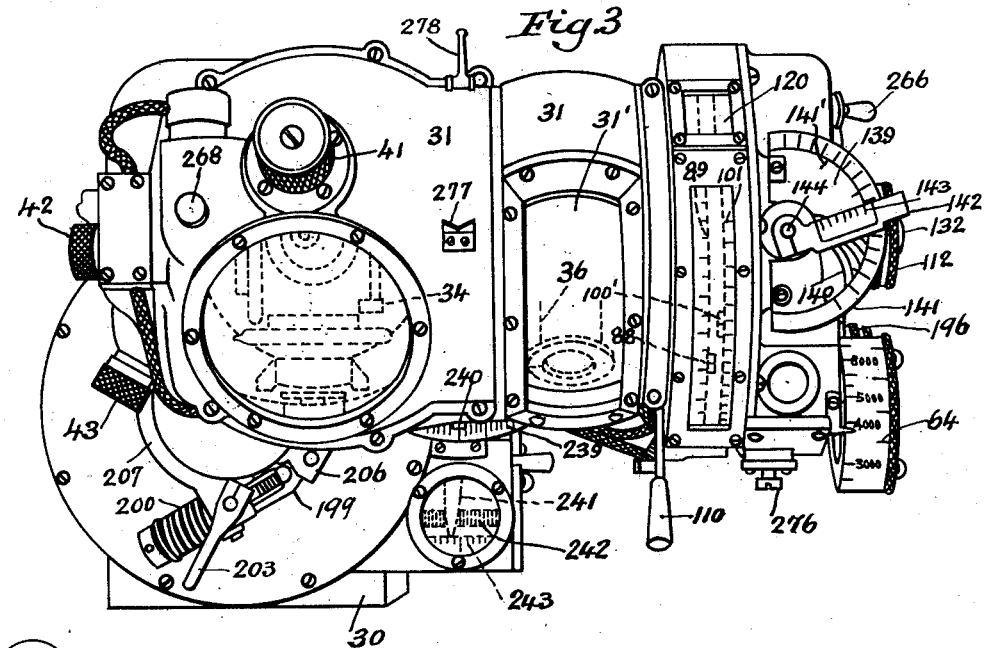
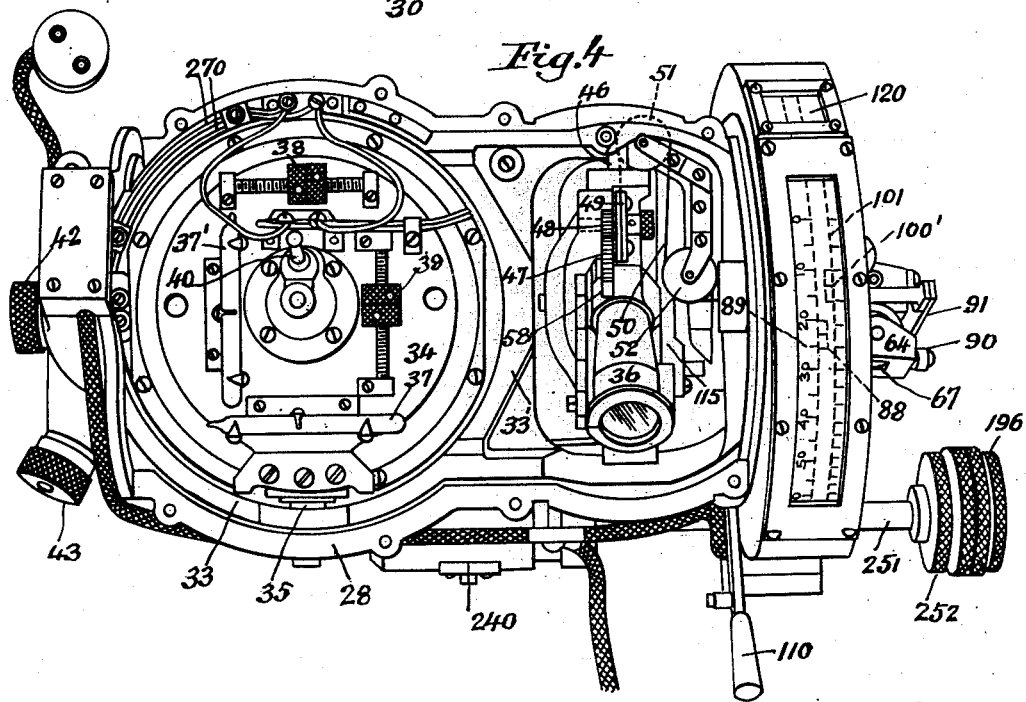

Dec. 19, 1950     T. H. BARTH     2,534,397
SYNCHRONIZING BOMB SIGHT
Filed April 5, 1935     12 Sheets-Sheet 3
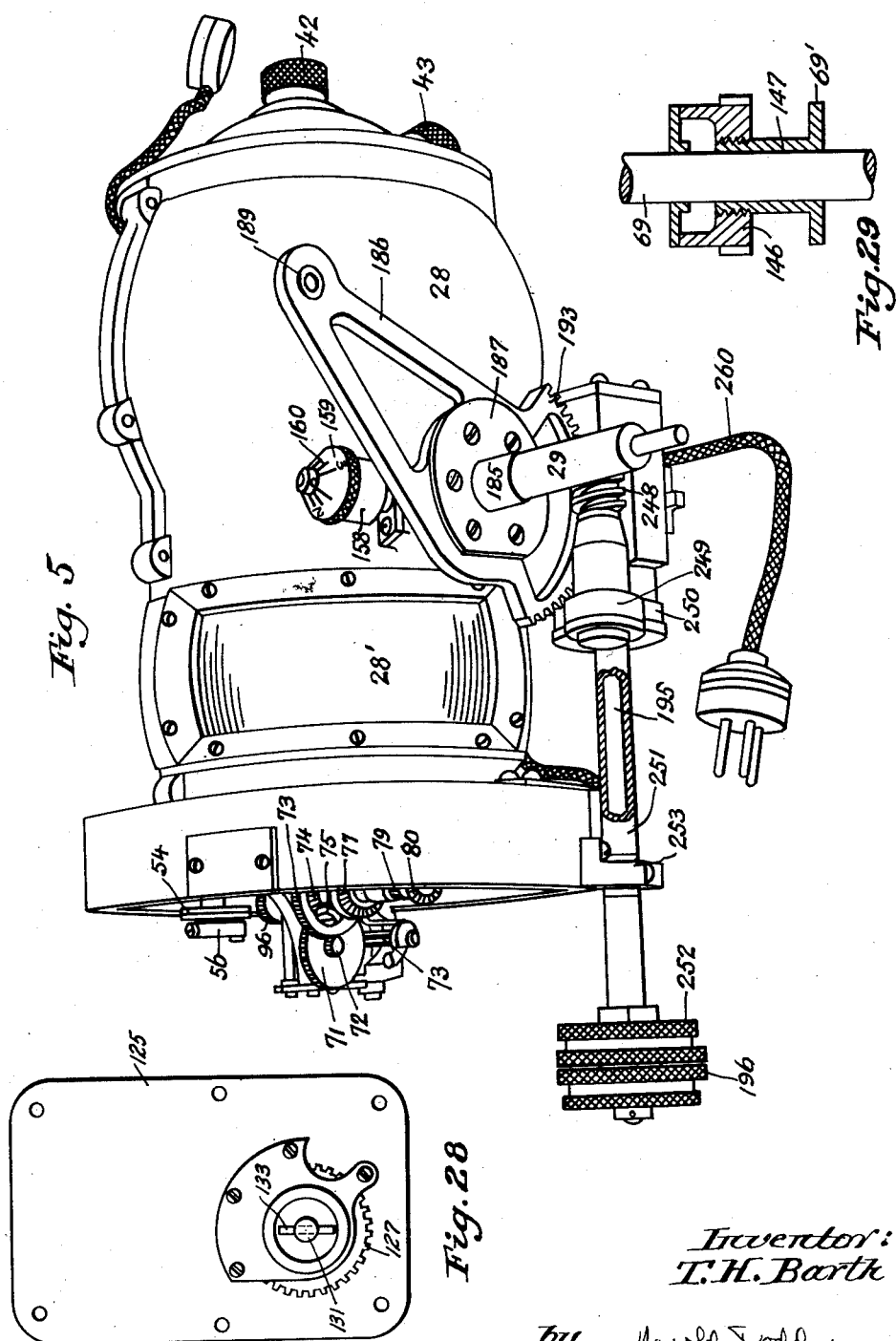
Inventor:
T. H. Barth
by Harold Todd
Attorney Dec. 19, 1950 T. H. BARTH 2,534,397
SYNCHRONIZING BOMB SIGHT
Filed April 5, 1935 12 Sheets-Sheet 4

Inventor:
T. H. Barth
Harold Dodd
Attorney

Dec. 19, 1950     T. H. BARTH     2,534,397
SYNCHRONIZING BOMB SIGHT

Filed April 5, 1935     12 Sheets-Sheet 5

Inventor:
T. H. Barth
by Harold Dodd
Attorney

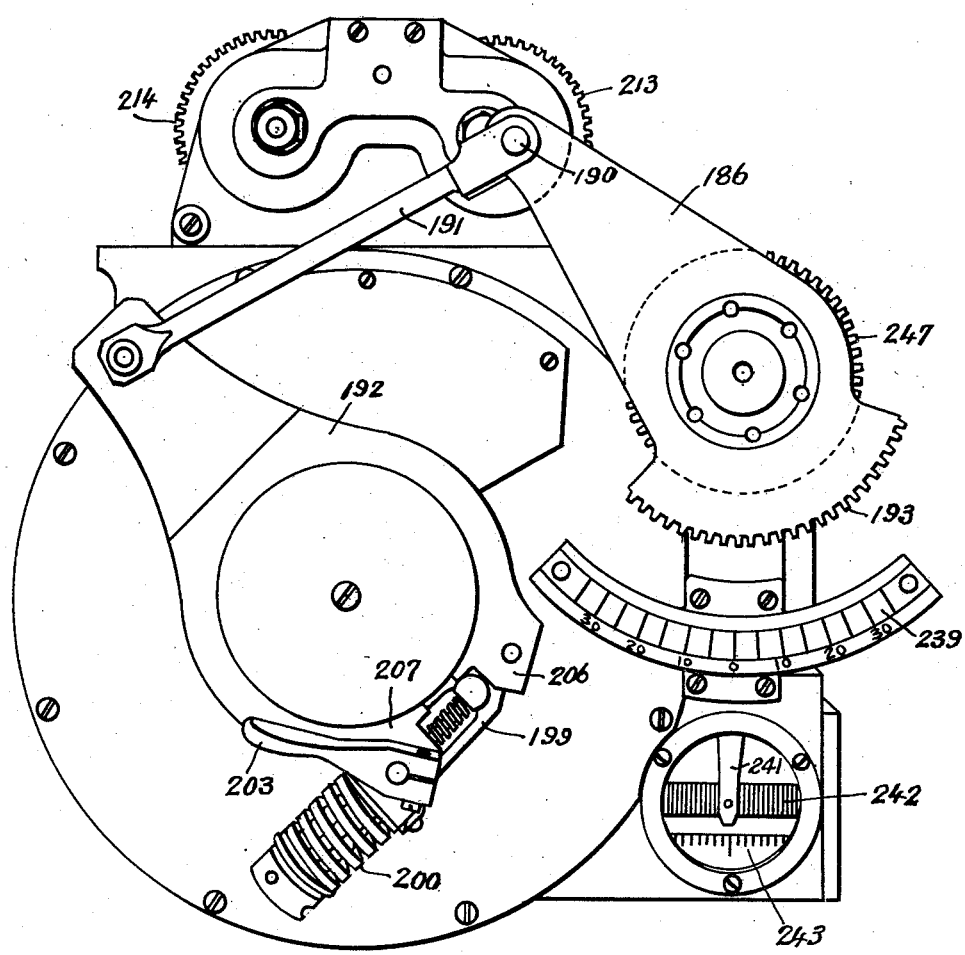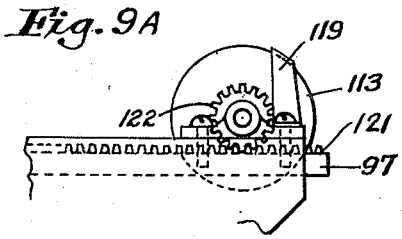

Dec. 19, 1950 T. H. BARTH 2,534,397
SYNCHRONIZING BOMB SIGHT
Filed April 5, 1935 12 Sheets-Sheet 7
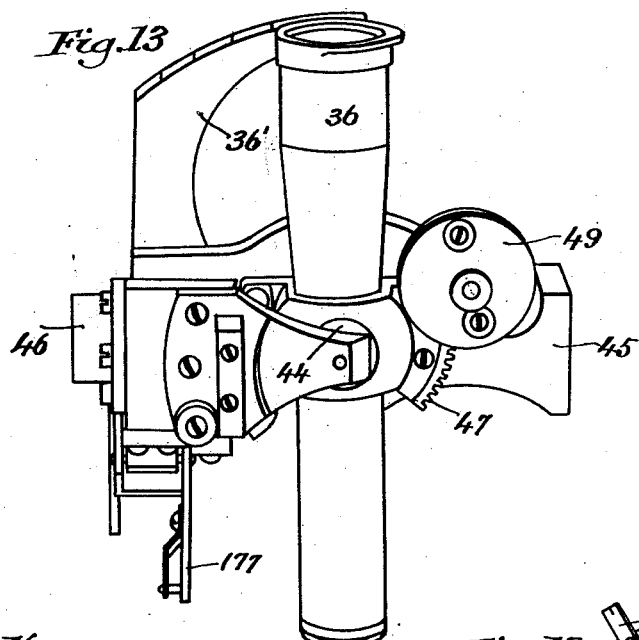
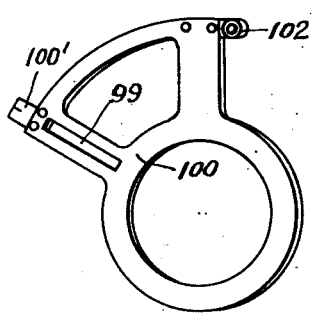
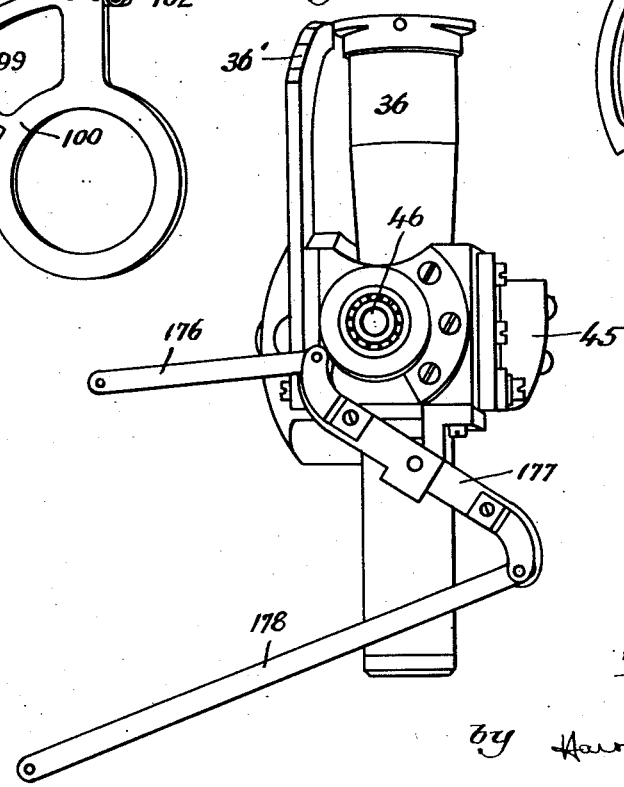
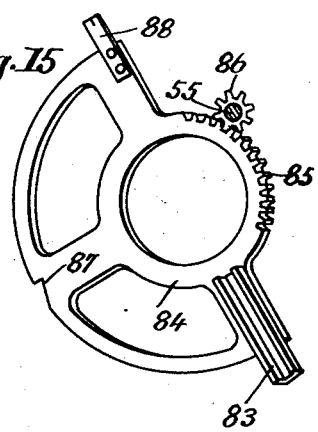
Inventor:
T. H. Barth
by Harold Dodd
Attorney Dec. 19, 1950     T. H. BARTH     2,534,397
SYNCHRONIZING BOMB SIGHT
Filed April 5, 1935     12 Sheets-Sheet 8
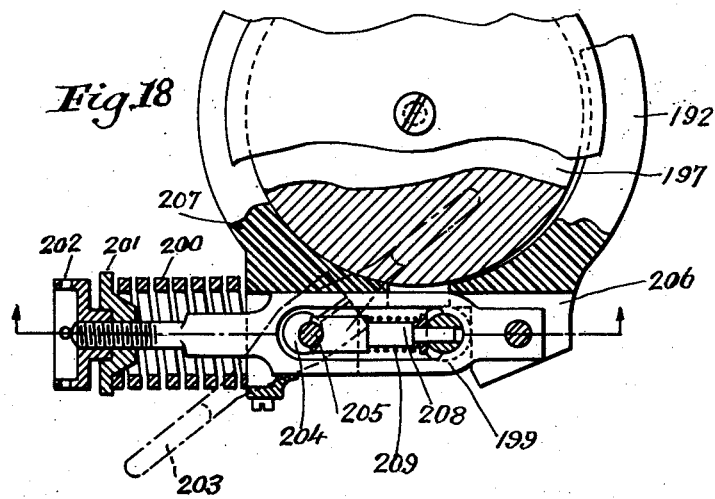
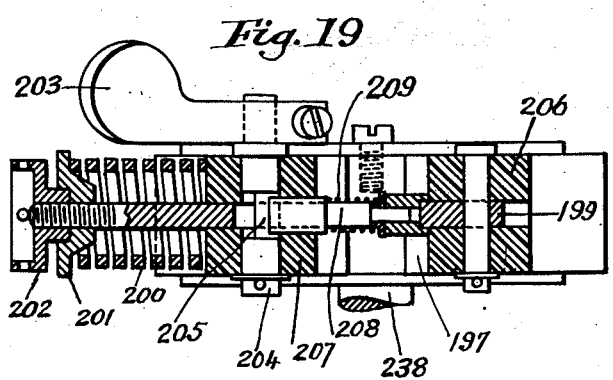
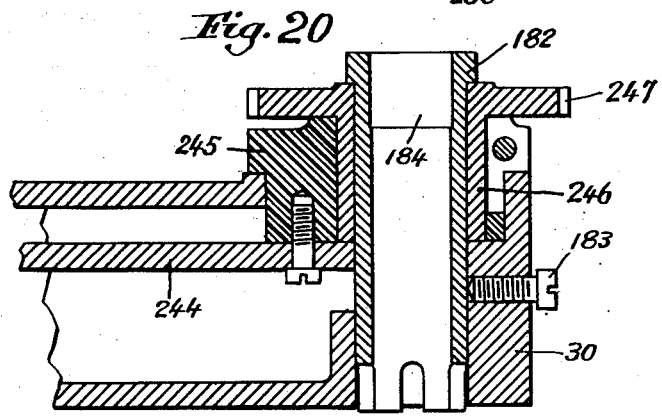
Inventor:
T. H. Barth
by Harold Todd
Attorney

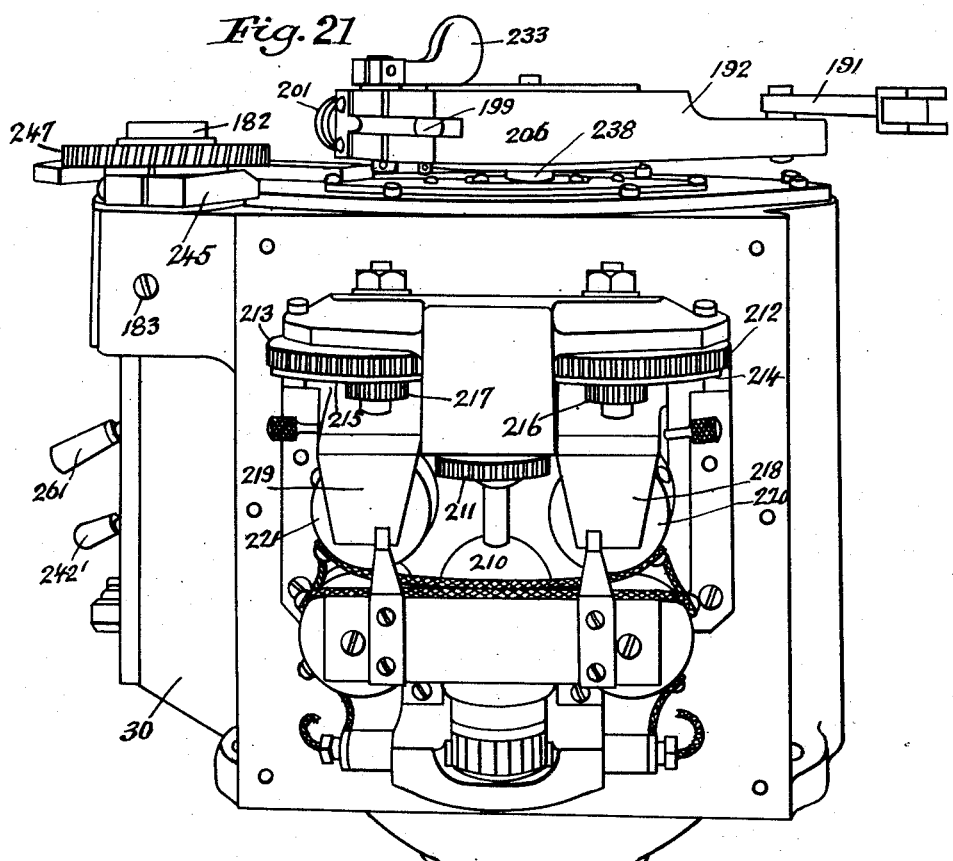
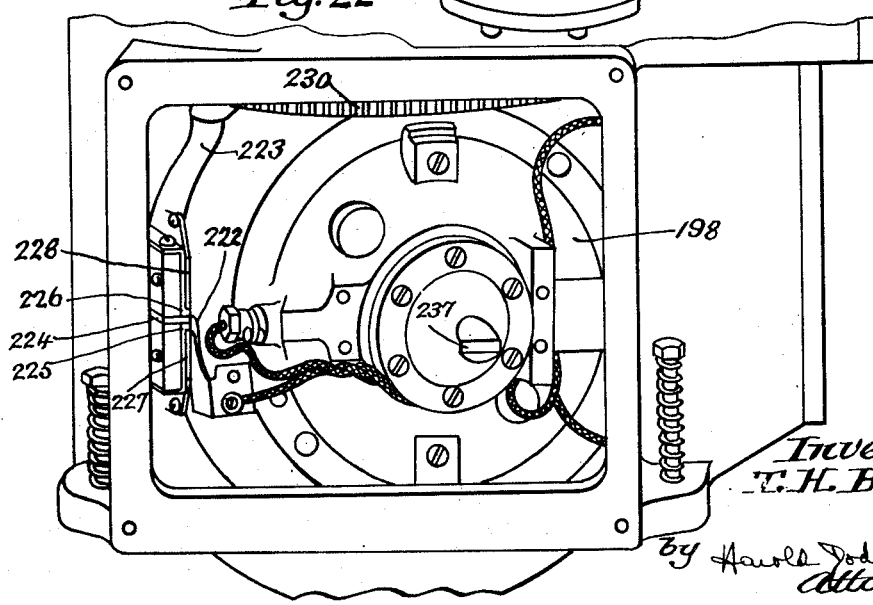

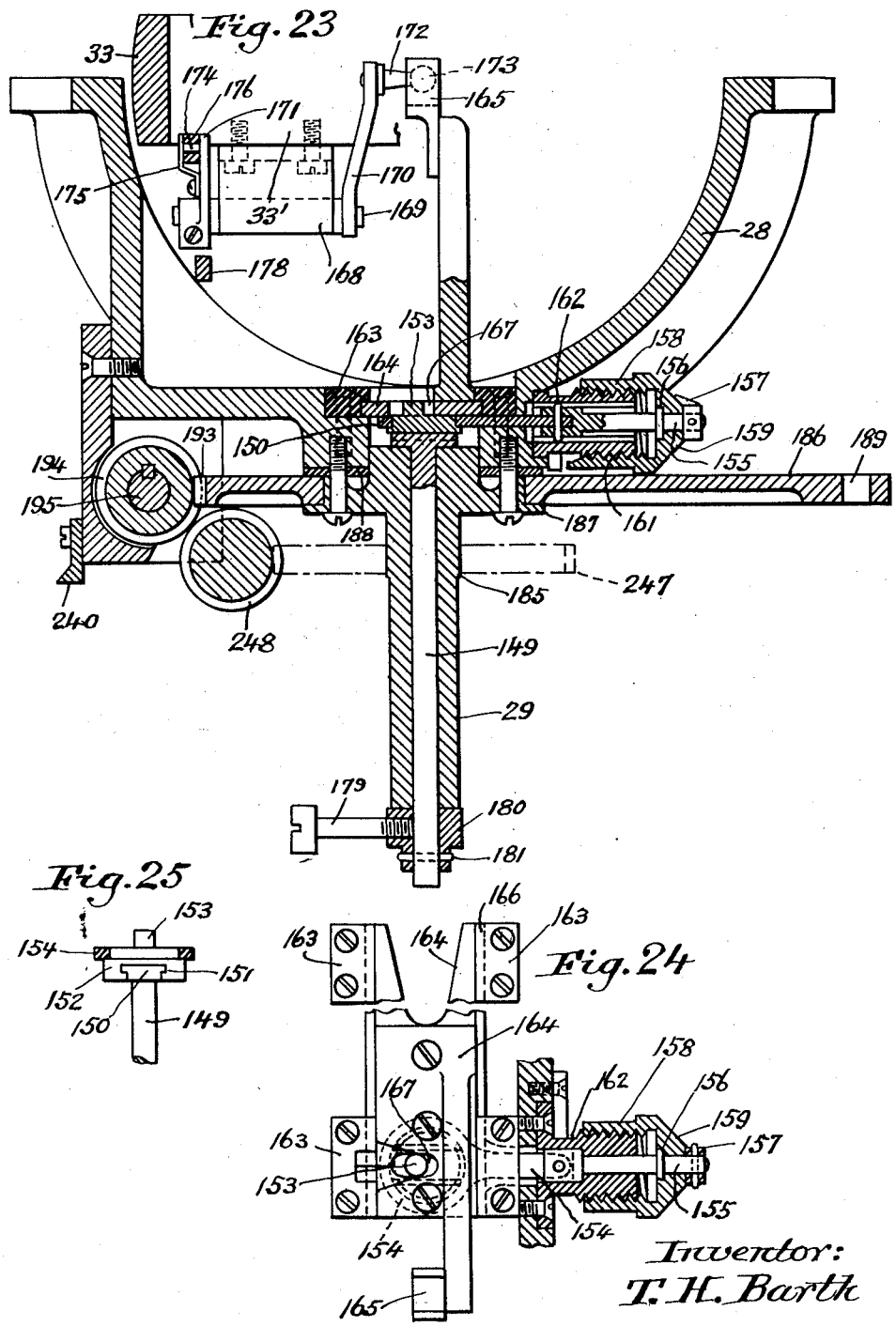

Dec. 19, 1950 T. H. BARTH 2,534,397
SYNCHRONIZING BOMB SIGHT
Filed April 5, 1935 12 Sheets-Sheet 11

Inventor:
T. H. Barth
by Harold Dodd
Attorney

Dec. 19, 1950     T. H. BARTH     2,534,397
SYNCHRONIZING BOMB SIGHT

Filed April 5, 1935     12 Sheets-Sheet 12

Inventor:
T. H. Barth
by Harold Dodd
Attorney

Patented Dec. 19, 1950

2,534,397

UNITED STATES PATENT OFFICE 2,534,397

SYNCHRONIZING BOMB SIGHT

Theodore H. Barth, New York, N. Y., assignor to the United States of America as represented by the Secretary of the Navy Application April 5, 1935, Serial No. 14,948

17 Claims. (Cl. 33—46.5)

This invention relates to a sight for use in dropping bombs from aircraft, and more particularly to a sight of that type having a sighting element that is movable to keep a target in the field of view as the craft approaches such target and variable speed mechanism to actuate the sighting element, commonly known as a synchronizing sight.

Among the several objects of this invention are:

To provide a synchronizing bomb sight having all its moving parts completely enclosed in a weather-tight casing;

To provide means for automatically releasing the bombs when the bomb carrying craft is in the proper position and which will prevent the inadvertent dropping of bombs by such automatic release;

To provide automatic means in a bomb sight to correct for the cross trail of a bomb;

To improve the clutch used to connect the sight proper to an azimuth stabilizing gyro.

With the above and other objects in view, this invention consists in the construction, combination and arrangement of parts as will be described more fully hereinafter.

The present invention is in general similar to the bomb sight shown in my copending application Serial No. 635,298 filed September 28, 1932, now Patent No. 2,438,532, granted March 30, 1948, but has numerous improved features which will be set forth in detail hereinafter.

The principle underlying the operation of this bomb sight involves the proportionality of the homologous sides of similar triangles. If an object on the ground be kept in the field of view of a telescope on an aircraft by turning the telescope about a transverse axis intermediate its ends, a member connected to the telescope on a line passing transversely through the optical axis of the telescope and mounted to slide horizontally in a plane parallel to the plane of swing of the telescope passes through a distance that has the same ratio to the ground distance covered by the craft as has the distance of the point of connection of that member to the telescope from the axis of rotation to the distance of the object on the ground from the same axis of rotation. Consequently, if the horizontally moving member be caused to travel at the proper speed, which is a function of the altitude and the speed of the craft, an object visible in the telescope will remain in the field thereof throughout the rotation of the telescope.

As used throughout this specification and the claims thereto appended, the term "front" refers to that side of the instrument next the operator, and "back" refers to the opposite side thereof; "right-hand" and "left-hand" refer to the relative positions of the parts of the instrument as seen from the operator's position.

In the drawings:

Fig. 3 is a top plan view of the complete sight;

Fig. 4 is a top plan view with the upper casing member removed;

Fig. 5 is a three-quarter bottom plan view of the sight proper taken from the back;

Figs. 9 and 9a are detail views of alternative forms of the ground speed indicator;

Fig. 13 is a side elevation of the telescope assembled in the supporting cradle therefor;

Fig. 14 shows the same parts as Fig. 13 on a line at right angles to Fig. 13;

Fig. 15 is a detail view of the ground speed segment;

Fig. 16 is a detail view of the range segment;

Fig. 17 is a top plan view of the azimuth stabilizer and pilot director assembly;

Figs. 18 and 19 are details of the clutch for connecting the azimuth stabilizer to the sight proper;

Fig. 20 is a sectional detail showing the sleeve in which the spindle that supports the sight proper is mounted;

Fig. 21 is a side elevation of the azimuth stabilizer mechanism showing the electromagnetic clutches thereof;

Fig. 22 is an elevational view of one side of the azimuth stabilizing gyro and the commutator associated therewith;

Figs. 23, 24, 25 and 26 illustrate various details of the automatic cross trail mechanism;

Fig. 28 is an elevational view of the inner face of the plate that carries the operating knob and the synchronizing knob;

Fig. 29 is a detail view of part of the trail correction device.

Figure 1:
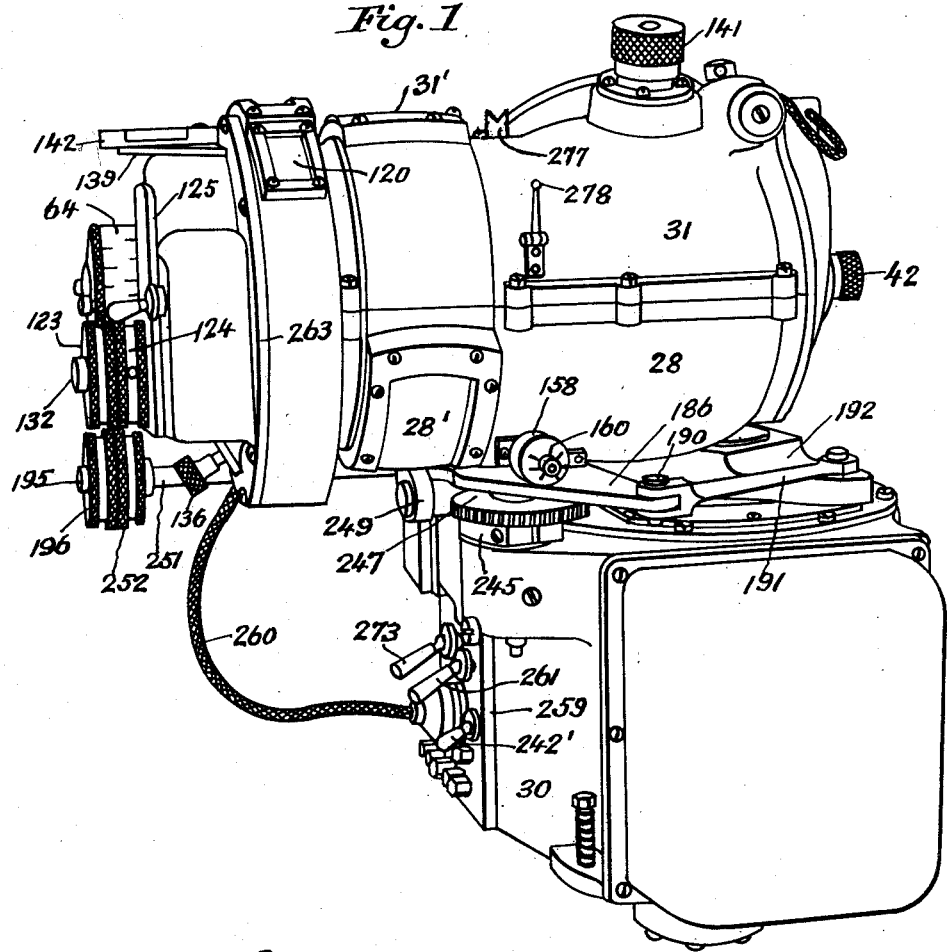
Fig. 1 is an elevation of the back of the complete sight and azimuth stabilizer.
Figure 2:
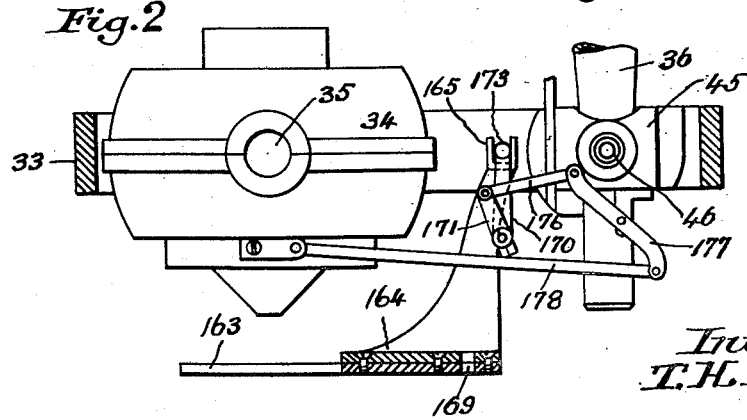
Fig. 2 shows the assembly of the stable vertical gyro, the telescope and parts of the automatic cross trail correction device.

The sight proper is enclosed by a lower casing member 28 (Fig. 5) supported on spindle 29 that is rotatably mounted in the azimuth stabilizer casing 30 (Fig. 1) and by upper casing member 31 that is detachably secured to casing member 28. Transparent windows 31' and 28' are provided in upper and lower casing members 31 and 28, respectively, adjacent the upper and lower ends of the sighting telescope to protect the mechanism from the weather while leaving the line of sight unobstructed in all possible angular positions of the telescope. Pivotally mounted in antifriction bearings at the ends of lower casing member 28 is the normally athwartship cardan 33 (Fig. 4), in one end of which is mounted the sight stabilizing gyro 34 upon trunnions 35 that lie at right angles to the Cardan bearings, the spin axis of gyro 34 being vertical to provide a stable vertical for the sighting telescope 36 that also is mounted in cardan 33 as will be hereinafter described.

Upon the upper surface of the casing of gyro 34 are fore-and-aft level 37', athwartship level 37, movable weights 38 and 39 for statically balancing the gyro and a forwardly and upwardly inclined pin 40 adapted to be engaged by a longitudinally slidable sleeve 41 to lock the gyro against movement when not in use. Knobs 43 and 42 are slidable toward and away from casing member 28 and are connected to friction rollers which, when the knobs are pushed in and rotated, will tilt the gyro 34 athwartship and fore-and-aft, respectively, to level the gyro.

Figure 10:
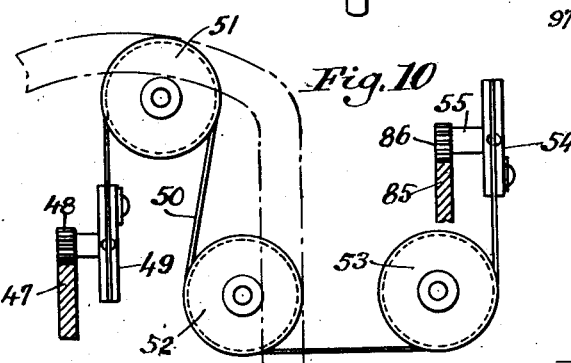
Fig. 10 is a detail view of the driving mechanism immediately associated with the sighting telescope.

Telescope 36 (Fig. 4) is rotatable in bearings 44 (Fig. 13) carried by cradle 45 that is mounted on trunnions 46 carried by cardan 33, whereby the cradle may rock athwartship and the telescope be rotated in a fore-and-aft plane. A gear sector 47 is secured to the telescope and meshes with a pinion 48 that is fixed on the same shaft as is cable drum 49, said shaft being rotatably mounted in a bearing on cradle 45. A very light flexible cable 50 (Fig. 10) is attached at one end to cable drum 49 and is in part wound on the drum, passes around sheaves 51 and 52 carried by cardan 33 through the axis of the right-hand Cardan trunnion, around a sheave 53 mounted on the outer face of the right-hand end of casing member 28 and thence to a cable drum 54 upon which also a part of the cable is wound and to which the other end thereof is attached. It is to be noted that cable 50 passes axially through trunnion 46 of cradle 45 and also through the Cardan trunnion to prevent the pull of the cable from exerting any tilting force upon either the cradle or the cardan. The length of free cable, between sheaves, where the cable passes through the cradle trunnion and also through the Cardan trunnion is sufficient to prevent detrimental twisting thereof by rocking of either the cradle or the trunnion. The cable 50 is preferably made of a large number of very fine strands of phosphor bronze wire which gives great flexibility with practically no stretch. To provide for adjusting the tension of cable 50 sheave 54 is secured to shaft 55 by means of a member 56 (Fig. 6) that clamps upon shaft 55 and is connected to sheave 54 by a screw 57.

The angular position of the telescope with respect to the vertical is indicated by calibration lines on an arcuate member 36' (Fig. 14) adjacent the ocular end of the telescope.

Figure 6:
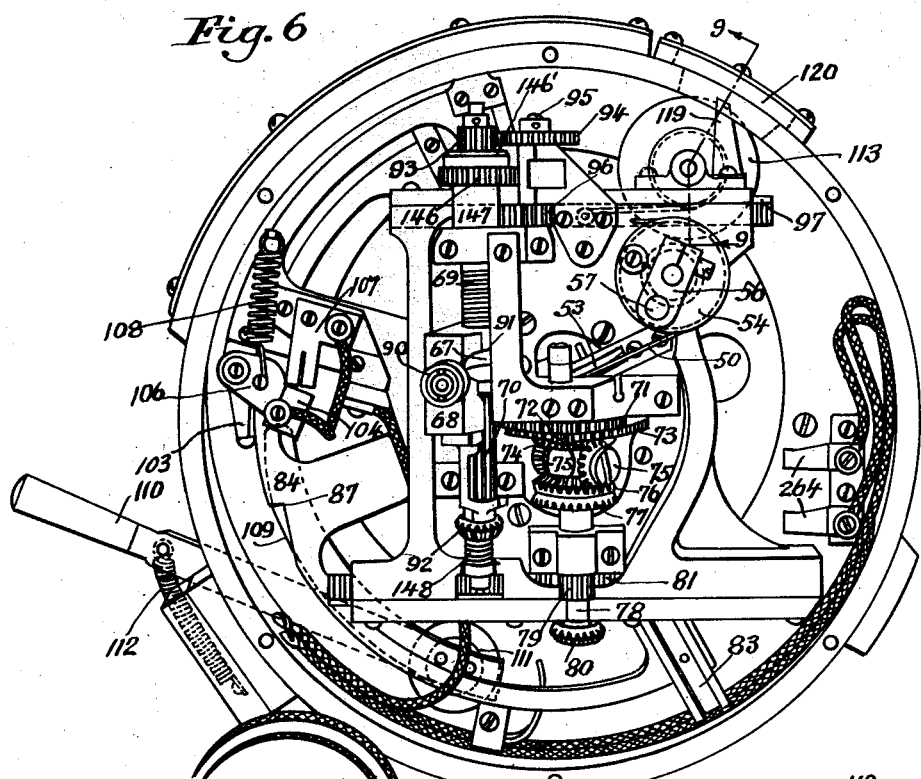
Fig. 6 is an assembly view of the synchronous drive transmission mechanism.
Figure 7:
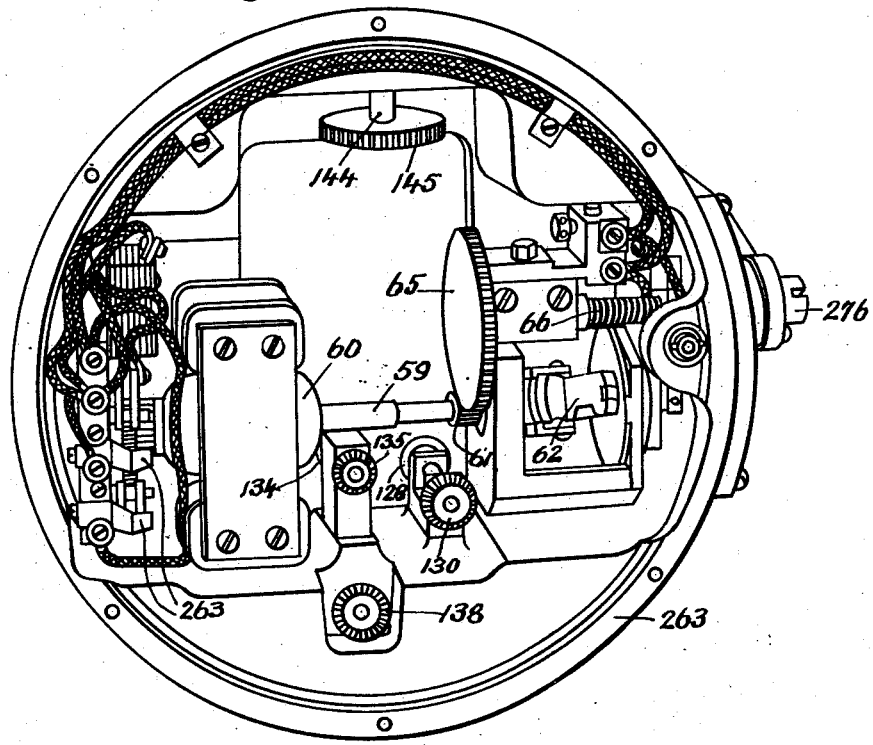
Fig. 7 shows the servomotor and associated parts to operate the mechanism in Fig. 6.
Figure 8:
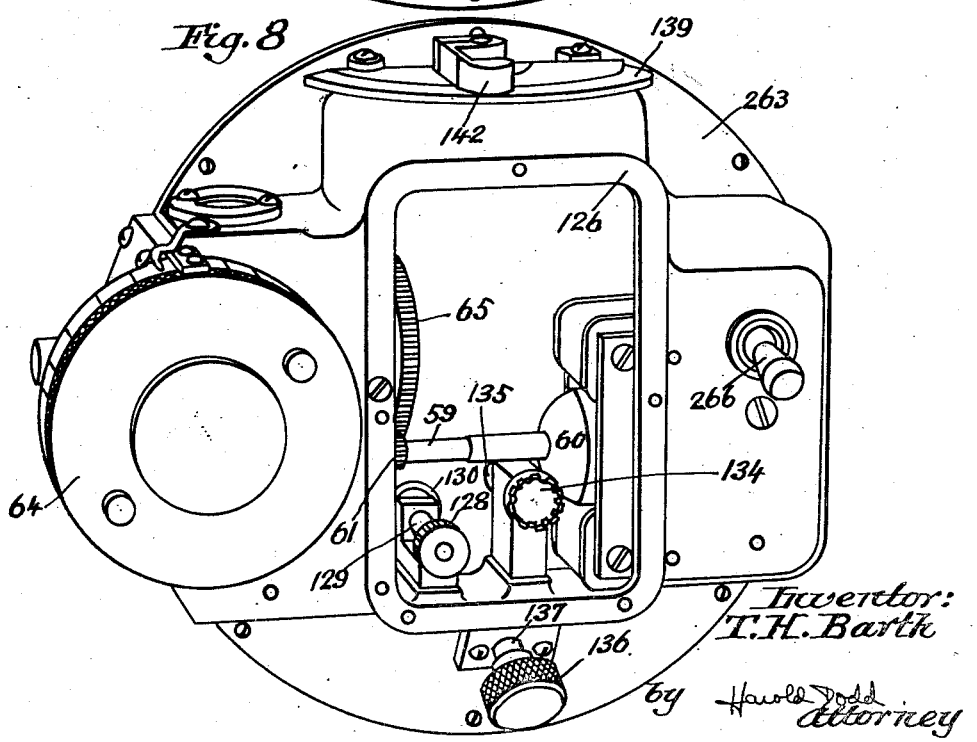
Fig. 8 is a view of the same assembly as Fig. 7 but taken from the opposite side thereof.
Figure 26:
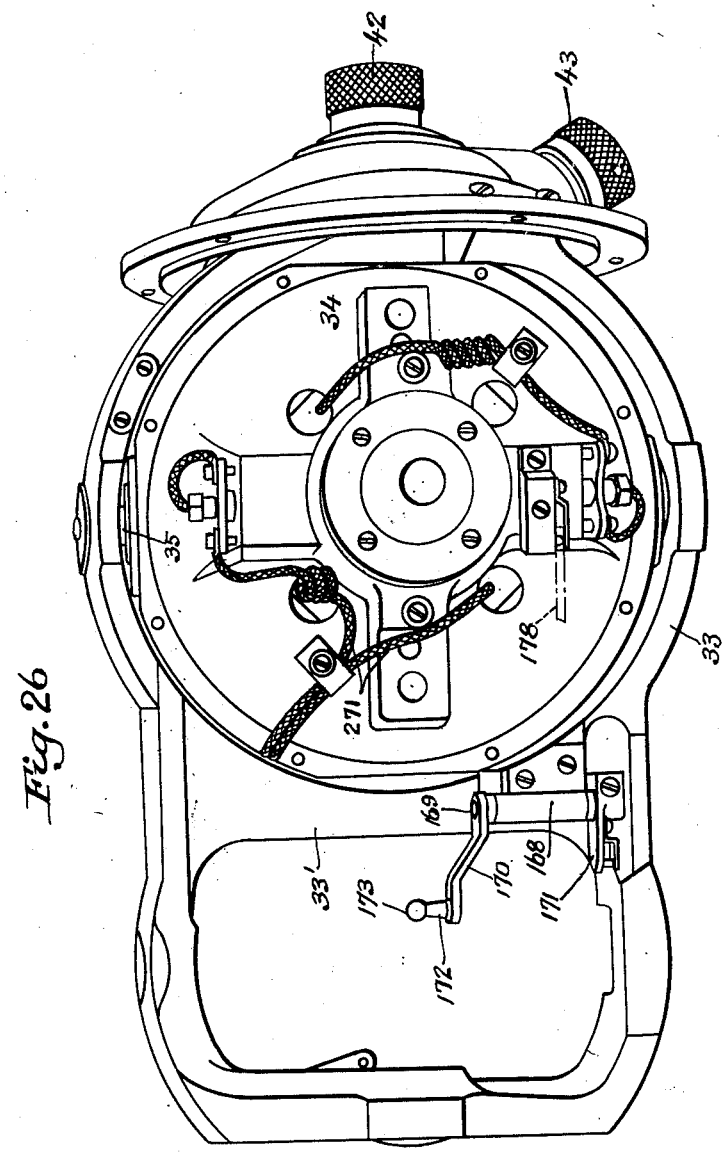

A flat clock spring is mounted in a housing 58 at the side of telescope 36 and has one of its ends attached to the telescope and the other end fixed to housing 58, which is concentric with the bearing 44 of telescope 36 and is secured to cradle 45. The winding of the spring is such that it tends always to move the ocular lens of the telescope (visible in Fig. 4) toward the front of the sight thus keeping cable 50 always under tension. When the eyepiece of the telescope is moved forward the clock spring is wound up and hence it rotates telescope 36 toward the operator when the pull upon cable 50 is relaxed. The mechanism for operating the telescope is shown in Figs. 6, 7 and 8.

The shaft 59 (Fig. 7) of servomotor 60 is prolonged to carry a pinion 61 and a governor mechanism 62 (the latter being of a type shown in my copending application Serial No. 551,008 filed July 15, 1931, now Patent 1,936,577 granted Nov. 28, 1933) that separates a pair of contacts 63 (Fig. 27) to interrupt the supply of current to motor 60 when the speed of the motor exceeds a predetermined value which depends upon the altitude from which the bombs are to be dropped, thus slowing down motor 60 to the proper speed. A knob 64 (Fig. 8) having on its periphery calibrations in terms of altitude may be turned to vary the spring tension acting upon governor 62 to obtain the correct speed for the given altitude. A second altitude scale on knob 64 indicates the settings to be used at different altitudes when the ground speed is to be determined, as described hereinafter. Since the characteristics of the fall of different types of bombs are not the same, a plurality of interchangeable knobs 64 each suitably calibrated for a type of bomb is provided. Pinion 61 meshes with teeth on the periphery of a disk 65 that is held in assured contact with the roller 67 (Fig. 6) by means of a spring 66 held under compression on the shaft of disk 65 to urge the disk outwardly against the roller 67 which is driven thereby. The roller 67 is mounted in a bracket 68 that is in screw-threaded engagement with screw spindle 69 and is moved longitudinally of the spindle when the spindle is rotated, which shifts roller 67 radially on disk 65. It is to be understood that the portion of roller 67 that contacts disk 65 is on the opposite side of bracket 68 from the part shown in Fig. 6. The shaft of roller 67 is toothed to form an elongated pinion 70 that is meshed with a gear 71 carried on a shaft upon which is fixed a pinion 72. The pinion 72 is meshed with a gear 73 to which is rigidly connected one gear 74 of a differential gear assembly. Pinions 75 of the differential engage the gear 76 which is rotatable on shaft 78 but is securely fixed to gear 77. The pinions 75 are in driving connection with a shaft 78 upon which is a pinion 79 and a beveled pinion 80. It is apparent that if the gear 77 be locked against rotation when pinion 70 is rotating, pinions 75 will be driven through gears 71, 72, 73 and 74 and caused to travel around gear 76 thereby rotating shaft 78, but if the gear 77 be free, the only result of driving the pinions 75 will be to rotate gear 77 upon shaft 78.

Figure 12:
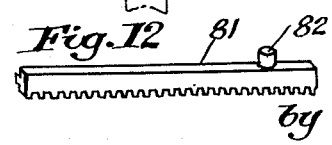

Ground speed rack bar 81 (Fig. 12) is mounted to slide horizontally and has its teeth engaged with pinion 79. A pin 82 on bar 81 is slidable in the radially extending slot bar 83 (Fig. 6) fixed to ground speed segment 84 (Figs. 6, 15) which is mounted to be rotatable about a member fixed to the end of the sight casing. The radial center line of slot bar 83 and the optic axis of the telescope 36 lie in a common plane at all times and hence no errors due to a difference in angular positions of the two can be introduced. Upon a portion of the segment 84 are teeth 85 (Fig. 15) meshed with a pinion 86 fixed on shaft 55 to rotate the cable drum 54. One edge of segment 84 is an arc of a circle and has formed therein a notch 87 into which an arm connected to the automatic release switch drops at the proper time as will be hereinafter set forth. A radially extending member 88 is fixed to the segment 84 to cooperate with the scale 89 (Fig. 4) calibrated in degrees of arc with its zero point corresponding to the vertical position of telescope 36; at the time of dropping the bomb, the member 88 indicates on scale 89 the dropping angle.

A roller 90 is mounted on the bracket 68 (Fig. 6) and may ride against a track 91 to prevent the roller 67 from being swung too far out of its illustrated position by the pressure of disk 65 thereagainst.

Figure 11:
Figs. 11 and 12 are side elevational details of the range bar and the ground speed bar, respectively.

A beveled pinion 92 is connected to the lower end of screw 69 and on the upper end of that screw is secured a pinion 93 that is meshed with a gear 94 on a shaft 95 to which pinion 96 also is fixed, the last mentioned pinion being meshed with rack teeth on horizontally slidable range bar 97 (Fig. 11). A pin 98 that extends laterally from range bar 97 is slidably disposed in slot 99 in the range segment 100 (Figs. 6, 16) which is mounted coaxially with the ground speed segment 84 and carries index 100' which is disposed adjacent a scale 101 (Fig. 4) to indicate the tangent of the range angle. A stud 102 carried by segment 100 serves as the pivot for arm 103 (Figs. 6, 27) of the automatic release switch whereof one blade 104 is carried by an insulating member 106 non-rotatably secured to arm 103, while the bifurcated blade 107, between the arms of which blade 104 is received to make contact, is fixed to the segment 100. A spring 108 having one end attached to range segment 100 and the other to member 106 tends to draw blade 104 into contact with blade 107 but the contact is prevented so long as arm 103 rides upon the periphery of the arcuate portion of segment 84. However, as the segment 84 is rotated, the notch 87 is moved into position so that arm 103 may drop into the notch and the blades 104 and 107 be brought into contact through the action of spring 108, thus closing the automatic release circuit and dropping the bomb. Under the stress of a bombing run the operator might forget to stop the mechanism with the result that the automatic release would be again actuated after the telescope had been returned to its original position and one or more bombs inadvertently dropped. To guard against this contingency a curved finger 109 (Fig. 6) is disposed with its free end in the path of the tip of the arm 103 to prevent the closing of the automatic release switch unless lever 110 is lifted to rotate the disk 111 upon which the finger 109 is secured and so swing the free end of the finger inwardly to an inoperative position, a spring 112 being provided to move lever 110 downwardly as soon as the lever is released by the operator.

Rotation of bevel pinion 92 will cause the bracket 68 to move up or down, since the screw 69 is threaded therein, thus changing the distance of the point of contact of roller 67 with disk 65 from the center of the disk and varying the rate at which pinion 70 and the gears connected thereto are driven. Any rotation of the screw 69 will be transmitted through pinion 93, gear 94, shaft 95 and pinion 96 to range bar 97 which in turn will shift the position of the range segment 100.

The purpose of moving the roller 67 on disk 65 is to cause telescope 36 to be rotated at such a rate as to synchronize its movement with the apparent movement of a target and so keep the target in the field of the telescope. It is apparent that the rate of rotation of telescope 36 for synchronism is a function of both the altitude of the craft and its speed with respect to the ground; the greater the altitude the closer roller 67 will be to the center of disk 65 for any given ground speed. However, since the range angle, or dropping angle, is a function of the time of fall of the bomb, which is one-fourth the square root of the altitude, the rotational speed of disk 65 must be changed in inverse proportion to the square root of the altitude to impart the correct relative rate of movement to the ground speed bar and telescope, which rate must be inversely proportional to the altitude.

Figure 9:
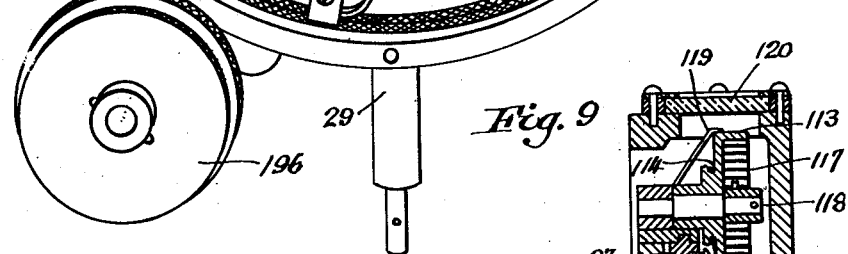

Inasmuch as the position of range bar 97 is a function of the ground speed and altitude it may be used to operate a ground speed indicator of which one form is shown in Figs. 6 and 9, but when so used, the speed of disk 65 must be controlled by the second calibration on knob 64, as mentioned above. This comprises a drum 113 having inscribed on its periphery calibrations representing ground speed. In a groove 114 formed on the side of the drum, a cable 115 is wound and has one end attached to the drum, the other end being secured to pin 116 on range bar 97. A flat spiral spring 117 is disposed within the drum with one end attached to the drum and the other end fixed to the stationary shaft 118 upon which the drum rotates. The spring 117 tends to rotate the drum 113 in a counter-clockwise direction as seen in Fig. 6 and thus movement of range bar 97 to the left in that figure winds up the spring. The point at which the calibrations on drum 113 are to be read is indicated by an index 119 visible through a window 120. An alternative form of the ground speed indicator is shown in Fig. 9a in which the range bar is provided with rack teeth 121 on its upper surface to engage a pinion 122 that is fixed to drum 113, the remainder of the structure being the same as in Fig. 9. It should be noted that when the speed of disk 65 is set for bombing it is not correct for the determination of ground speed, and vice versa.

The actuating mechanism is manipulated by means of operating knob 123 (Fig. 1) and synchronizing knob 124 carried by a plate 125 that seats upon the plane faced flange 126 (Fig. 8). Synchronizing knob 124 is fixed to one end of a hollow shaft upon the other end of which is a gear 127 (Fig. 28) meshed with gear 128 (Figs. 7, 8) secured on a shaft 129 that has secured on it a beveled pinion 130 that engages the pinion 92 in Fig. 6. Operating knob 123 (Fig. 1) is fixed to a shaft, also hollow, that is disposed within the shaft that carries knob 124. Splined in the shaft of knob 123 is a rod 131 having a head 132 on its outer end and a pin 133 extending transversely therethrough adjacent its inner end, which pin is engageable with the notches in a crown gear 134 on a shaft having a spur gear 135 that meshes with gear 77 in Fig. 6. A knurled knob 136 (Fig. 8) is carried on a shaft 137 that has fixed to its other end a beveled gear 138 (Fig. 7) that may be moved into engagement with beveled gear 80 in Fig. 6 but is normally held out of mesh therewith by a spring that moves the shaft 137 outwardly. It will thus be seen that turning the synchronizing knob 124 will rotate the screw 69 which causes the roller 67 to be moved radially on disk 65 and also shifts range bar 97 to the right or the left depending upon the direction of rotation of the knob. The knob 136 is connected to ground speed bar 81 by means of pinions 138, 80 and 79 and since the ground speed bar 81 is connected to range segment 84, by turning the knob 136 a rapid movement may be imparted to telescope 36. Slower setting of the telescope is accomplished by pushing in the head 132 whereby the operating knob 123 is connected to the gear 77 which, in turn, is connected to ground speed bar 81 through shaft 78 and pinion 79. The telescope cannot be shifted by means of knob 136 if knob 123 is clutched in, owing to the disadvantageous gear ratios through which the operation would have to be effected.

As is well known, the effect of air resistance upon a falling bomb is to cause the bomb to lag behind the craft from which it is dropped so that the craft will be vertically above a point beyond the target at the time the bomb strikes. The angle between the vertical line to the airplane and a line from the plane to the target at the time of impact of the bomb is known as the trail angle and to insure accurate dropping of the bomb, this angle must be corrected for in setting the dropping angle. The mechanism for making this correction comprises a semi-circular plate 139 (Figs. 1, 3) upon which are inscribed a series of curves 140 that give the characteristics of the fall of a particular type of bomb at different air speeds and has a scale 141 of mils on its edge. A lever 142 having on it a scale 143 to show altitudes is pivoted at the center of plate 139 and is connected by shaft 144 to a gear 145 (Fig. 7) that meshes with gear 146 (Fig. 6). The gear 146 has internal threads (Fig. 29) that are engaged with external threads on sleeve 147 integral with upper screw spindle bearing 69', the gear 146 being disposed to rotate about an extension of screw spindle 69 independently of the screw spindle as to rotational movement but is connected thereto by means of thrust washer 146' to move member 69 longitudinally. Movement of lever 142 over plate 139 rotates gear 145 which, in turn, drives gear 146, causing the latter gear to be moved longitudinally due to its being in threaded connection with the fixed bearing 69', which produces a longitudinal shifting of screw member 69 and with it the roller 67 carried thereby and thus the rate at which telescope 36 is driven is varied to the proper degree to correct for the trail angle. By setting the altitude mark on lever 142 which represents the height at which the craft is flying to coincide with curve 140 representing the speed of the plane, the proper trail correction, is applied. A spring 148 acts upon the screw spindle 69 to prevent longitudinal instability thereof due to its freedom of movement in that direction and also to move the spindle down when gear 146 is moved downwardly on sleeve 147.

If the bombing craft is not moving directly toward the target in the plane in which the path of fall of the bomb will lie, there is also a relative lateral deviation of the bomb from the plane in which telescope 36 moves which is known as the cross trail. It is apparent that after the telescope 36 has been brought on the target, any lateral change in the course of the plane will vary the cross trail angle and it is therefore necessary that means be provided to correct automatically the position of telescope 36 to compensate for such changes. The mechanism by which this correction is introduced is shown in Figs. 2, 23, 24, 25 and 26.

As shown in Fig. 23, a stem 149 is disposed in the axial bore in spindle 29 that supports the sight casing. At the upper end of this stem is a head 150 with its greatest dimension disposed transversely of casing member 28 and having flanges 151 extending laterally therefrom. A member 152 having in it a recess corresponding to the shape of head 150 is slidably mounted on the head and has a stud 153 projecting from its upper surface. A strap 154 is engaged with member 152 and is non-rotatably connected to a bar 155 having on it a radially extended flange 156 and an index 157 secured to its outer end. A sleeve 158 is held between flange 156 and index 157 to be rotatable on bar 155 but not slidable thereon. Upon the outer face 159 of the sleeve 158 are calibrations 160 representing cross trail angles. Internal threads 161 in sleeve 158 are engaged with corresponding threads on a member 162 fixed to casing member 28. It is apparent that rotation of sleeve 158 to set one of the calibrations 160 in registry with index 157 results in a longitudinal movement of the sleeve which is transmitted to the member 152 that carries stud 153.

A guide member 163 is fixed to the inner face of casing member 28 at substantially its lowest portion and extends longitudinally thereof. Base 164 of yoke 165 has beveled edges that are slidable in undercut grooves 166 in the member 163 and a transverse slot 167 in base 164 is so disposed that stud 153 is slidable therein. Fixed to cross member 33' of cardan 33 is a bearing member 168 in which is journaled a shaft 169, there being an arm 170 fixed to one end of shaft 169 and a second arm 171 fixed to the other end thereof. The arm 170 carries a stem 172 upon the free end of which is a ball 173 that is operatively engaged with yoke 165. By means of a pin 174 on arm 171 and a retaining spring 175 cooperating therewith, arm 171 is connected to one end of a link 176 whereof the other end is connected to lever 177 that is pivotally mounted intermediate its ends on cradle 45, the other end of lever 177 being connected to a link 178 which connects cradle 45 and gyro 34 for stabilizing the cradle. When sleeve 158 is set with the zero point of calibrations 160 in coincidence with index 157, stud 153 is concentric with stem 149 and spindle 29 and rotation of casing 28 about the axis of spindle 29 produces no movement of the cross trail correction device. However, when sleeve 158 is turned away from the zero position, stud 153 is offset from the center of rotation of spindle 29 and since stem 149 is held against rotation by a set screw 179 that is threaded in a fixed bracket 180, any turning of the casing 28 will result in the sliding of base 164 in the guides 163 due to the action of the eccentric position of the stud 153 upon the sides of slot 167, which sliding movement of yoke 165 carried by the base 164 will rotate arm 170, shaft 169 and arm 171 and result in a longitudinal movement of link 176 which will tilt cradle 45 to apply the cross trail correction to telescope 36. A pin 181 is passed through a hole in stem 149 to insure the proper positioning of the head 150.

The spindle 29 is rotatably mounted in a sleeve 182 (Fig. 20) secured in the azimuth stabilizer casing 30 by a screw 183 and having a shoulder 184 upon which seats the shoulder 185 on spindle 29. An arm 186 (Fig. 23) is rotatable on the enlarged upper portion of spindle 29 where it is clamped in position between a flange 187 and a bearing strip 188 that lies against the bottom of casing member 28. At one end of arm 186 is an aperture 189 to receive a pin 190 by means of which the arm is connected to a link 191 that is also pivotally connected to clutch 192. At the other end of arm 186 is a gear sector 193 that meshes with a worm gear 194 (Fig. 23) on one end of a shaft 195 (Fig. 5) having a knob 196 on its other end. The jaws of clutch 192, which are preferably of a composition such as that known by the trade name of Micarta, are disposed to grip a drum 197 that is connected to the cardan of azimuth stabilizing gyro 198 (Fig. 22). The clutch mechanism (Figs. 18 and 19) consists of a member 199 connected at one end to jaw 206 of clutch 192 and slidable in jaw 207 thereof. A spring 200 held under variable compression by means of a washer 201 and a nut 202 that is threaded on member 199, bears against the jaw 207 in which member 199 is slidable and tends to move the jaws into clamping position upon drum 197. A lever 203 is fixed to a shaft 204 that is rotatable in the clutch jaw 207, the intermediate portion of the shaft being cut away to leave an eccentrically disposed portion 205 that bears against a member 208 so placed as to be capable of exerting a thrust against jaw 206. When lever 203 is turned to cause eccentric portion 205 to bear against member 208, the jaws are separated and drum 197 may rotate independently of the clutch, but when the eccentric portion is turned away from member 208 the spring 200 draws the jaws together and engages the clutch with drum 197. A spring 209 on member 208 causes that member to remain in light contact with eccentric portion 205.

A servomotor 210 (Fig. 21) drives a gear 211 which, in turn, through a train of reducing gears, drives gears 212 and 213 in opposite directions. Upon the shafts of gears 212 and 213 are respectively the clutch plates 214 and 215 and gears 216 and 217 fixed to the clutch plates, the clutch plates and their associated gears being freely rotatable upon the respective shafts. Rockable armatures 218 and 219 are so connected to clutch plates 214 and 215 as to move the clutch plates into frictional driving contact with the faces of gears 212 and 213 when drawn toward the solenoids 220 and 221. Upon the casing of gyro 198 is secured a light commutator brush 222 (Figs. 22, 27) that rides over a commutator carried by cardan 223 of gyro 198. As shown more plainly in Fig. 27, this commutator consists of a central insulating segment 224 with conducting segments 225 and 226 on each side thereof and a second pair of contact segments 227 and 228 separated respectively from segments 225 and 226 by insulating means 229.

The spin axis of gyro 198 is horizontal, the relative direction thereof with respect to the fore-and-aft line of the craft being immaterial since this gyro is solely to impart directional stability to the sight casing. Any tilting of the spin axis of gyro 198 from the horizontal will result in the movement of brush 222 over the commutator segments associated therewith, resulting in a flow of current to one of the solenoids 220 or 221 whereupon the rockably mounted armature 218 or 219, as the case may be, will be attracted by the energized solenoid and will move the clutch disk connected thereto into driving contact with the face of the gear 212 or 213. The pinion 216 or 217 associated with the clutch disk so actuated will impart, through a suitable train of gears, to the ring gear 230 on cardan 223, the driving force exerted by the servomotor 210 upon the gear 212 or 213, which will apply a precessing torque to the gyro in the proper direction to bring the spin axis thereof back to the horizontal.

Figure 27:
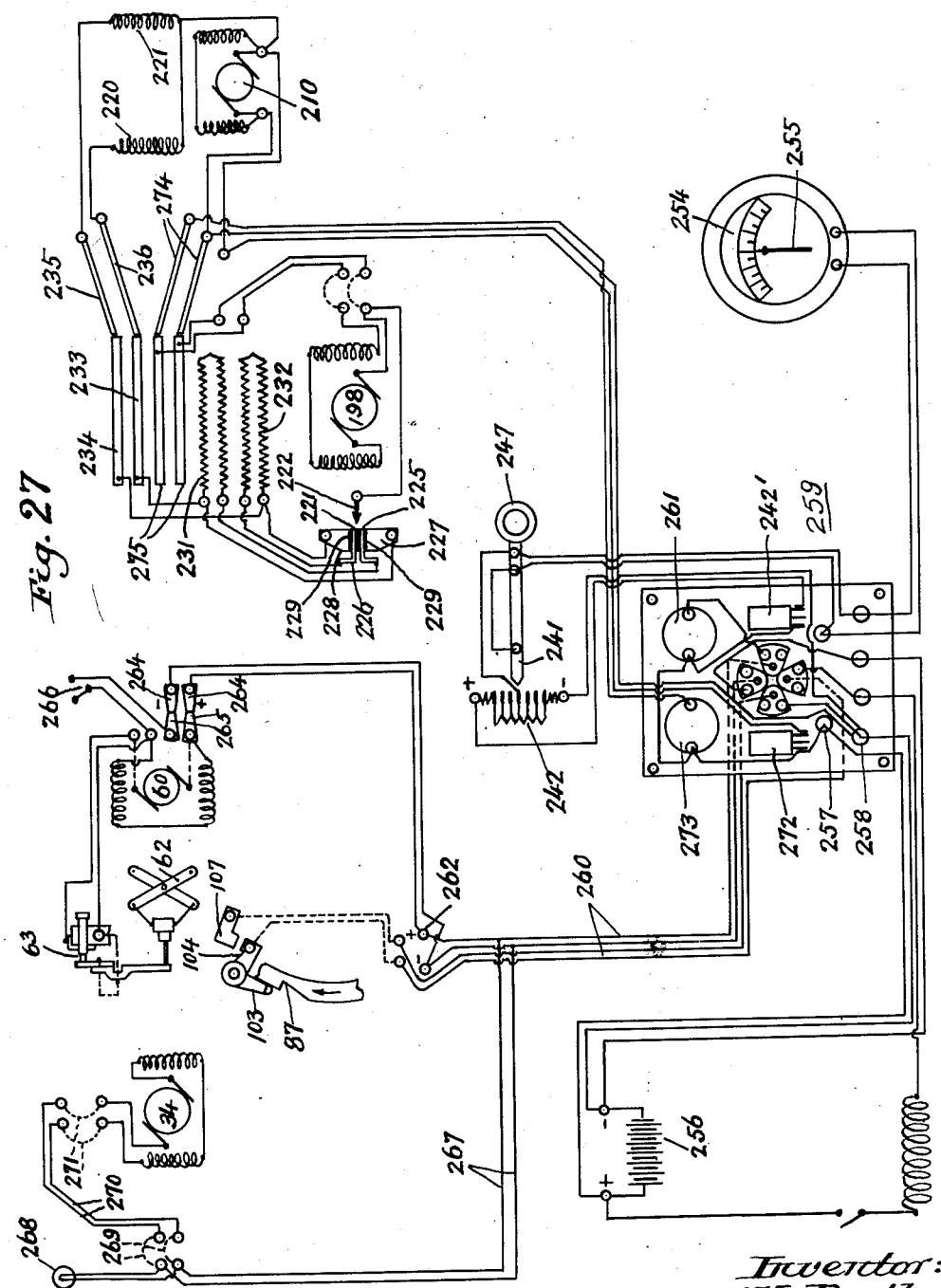
Fig. 27 is a wiring diagram of the bomb sight and pilot director assembly.

The purpose in using two conducting segments on each side of neutral insulating segment 224 is to obtain smoother action in the gyro precessing mechanism above described. As shown in Fig. 27, the conducting segments 225 and 226 are connected through resistances 231 and 232 respectively to the slip rings 233 and 234 on the cardan 223 from which the current is taken by brushes 235 and 236 to the solenoids 220 and 221. Consequently, if the spin axis of gyro 198 is but slightly displaced from the horizontal, the current transmitted to the solenoid involved will be reduced by the resistance in the circuit. However, if the spin axis be displaced sufficiently to move the brush into contact with one of the segments 227 or 228, the resistance is shunted out and the full strength of the current is applied to restore the gyro. As shown in Fig. 22, a lug 237 is provided on the casing of gyro 198 to contact the casing 30 and prevent tilting of the spin axis sufficiently to move brush 222 off the outer end of either of segments 227 or 228.

Drum 197 is connected by means of shaft 238 to the cardan 223 and when clutch 192 is engaged with the drum, the sight casing will be stabilized in azimuth by gyro 198, but when it is desired to rotate the sight casing independently, clutch 192 is disengaged from drum 197 which permits free rotation of sight casing spindle 29 in sleeve 182.

It is essential that the bomber be able to direct the pilot upon the course to be flown and for this purpose a pilot director system is associated with the sight. A scale 239 (Fig. 3) is mounted on the upper side of casing 30 to cooperate with an index 240 carried by lower casing member 28, the zero point of scale 239 being so disposed that when index 240 is in coincidence therewith the sight casing is at right angles to the fore-and-aft line of the craft. A pilot director brush 241 (Fig. 3) is disposed to move in contact with a commutator 242, with its tip adjacent a scale 243 that indicates deviation of brush 241 from the fore-and-aft direction. Brush 241 is mounted on an arm 244 (Fig. 20) that is secured to a member 245 in frictional engagement with a sleeve 246 carried by a gear 247 that is concentric with and rotatable upon sleeve 182, the frictional contact of member 245 with sleeve 246 being such that so long as brush 241 is freely movable, it will be shifted by rotation of gear 247 but when the brush contacts a limit stop (not shown) at either end of the commutator, the member 245 will slip on sleeve 246. A worm gear 248 (Fig. 5) is driven by means of gears enclosed in housings 249 and 250, the gear in the latter housing being fixed on a hollow shaft 251 that encloses shaft 195 and has a knob 252 on its outer end, shaft 251 being journaled in a bracket 253 carried by the sight casing in a manner to prevent longitudinal movement of the shaft. By means of knob 252 and parts connected thereto, gear 247 may be rotated to move brush 241 over commutator 242. Also, worm 248 and the associated members form the connection between gear 247 and the sight casing such that rotation of the sight casing about its vertical axis will move the brush 241 over commutator 242 and therefore any deviation of the craft from a course set by the bomber will be indicated by displacement of brush 241 on scale 243. When knob 196 is turned the pilot director brush 241 is rotated, within the limits of its possible movement, at the same rate as the sight; when knobs 196 and 252 are turned simultaneously at the same rate the brush moves 5.2 times as fast as the sight for over-correction to bring the plane more quickly upon a collision course.

As shown in Fig. 27, the commutator 242 is connected to a pilot director indicator 254 that is in a position where it is readily observable by the pilot. Since, when clutch 192 is engaged with drum 197 the bomb sight casing is stabilized by gyro 198, any change in the course of the craft will result in a relative movement between the bomb sight casing and stabilizer casing 30 and will displace brush 241 over commutator 242 which displacement will be transmitted to pointer 255 of indicator 254 and will show to the pilot the direction and number of degrees of such deviation.

The wiring diagram of the bomb sight, the directional stabilizer and the pilot director are shown in Fig. 27. The positive and the negative terminal of battery 256 are connected to binding posts 257 and 258, respectively, of terminal block 259 mounted on the side of stabilizer housing 30. The cord 260 connects to the terminal block 259 through sight switch 261 to the terminal block 262 carried by the removable end portion 263 of the sight casing, in which portion are mounted servomotor 60 and the contact point 63 controlled by governor 62. To avoid the necessity of disconnecting wires from binding posts when the portion 263 is removed, spring contacts 264 are provided on the fixed portion of the casing and cooperate with like spring contacts 265 on portion 263 to complete the circuit. A switch 266 controls the supply of current to servomotor 60. Wires 267 supply current to the lamp 268 which illuminates the upper surface of bomb sight gyro 34 and to gyro 34 through flexible leads 269, wires 270 carried by cardan 33 and flexible leads 271 from the cardan to the gyro. A switch 272 connects servomotor 210 to terminal block 259 and switch 273 controls the current supply to directional gyro 198 and brush 222 through brushes 274 and slip rings 275 on cardan 223. The current supply to the pilot director system is controlled by switch 242'.

*Operation*

Before a bombing run is started, switch 266 should be closed to start servomotor 60, and the correctness of the speed thereof determined by engaging a tachometer with tachometer connection 276 that is mounted on an extension of the servomotor shaft. This determination should be made for several of the altitudes shown on altitude knob 64 since it is essential to accurate functioning of the sight that disk 65 rotate at the correct speed for the altitude calibrations on the knob 64 for the type of bomb being used since, as above explained, a different knob 64 is employed for each type of bomb.

As the objective is neared, servomotor 60, sight gyro motor 34, stabilizing gyro 198 and servomotor 210 are started, trail correction lever 142 is set for the speed of the plane and the altitude from which the bombs are to be dropped, the cross trail correction mechanism is adjusted, and altitude knob 64 also is set at the bombing altitude. Assuming the bombing altitude to be reached and the target to be in sight, the bomber releases clutch 192 from drum 197 and swings the sight casing back and forth which causes movement of pointer 255 back and forth over the scale of pilot indicator 254 and notifies the pilot that the bomber is prepared to indicate the course to be followed. When the plane is on the desired course the bomber effects a rough sight on the target by means of the open sight comprising parts 277 and 278 after which the target is picked up through telescope 36, the brush 241 is set at the zero point of scale 243 and clutch 192 is engaged with drum 197, which stabilizes the sight casing in azimuth, the telescope 36 being continuously vertically stabilized by gyro 34.

Knob 136 is pushed into mesh pinion 138 with pinion 89 and the knob is then rotated to bring the telescope approximately on the target, the fine sighting adjustment of the telescope being accomplished by pushing in head 132 to clutch knob 112, through gears 134 and 135, to gear 77. Knob 124 is rotated to set roller 67 at a distance from the center of disk 65 such that the telescope will be driven through gears 70, 71, 72, 73, differential gears 75, 77 and bar 81 at a speed that will keep the telescope on the target. The setting of knob 124 should be effected by observing whether the horizontal cross line of the telescope remains on the target or drifts off; in the former case the setting is correct but in the latter case roller 67 must be moved on disk 65 until the cross line does remain on the target.

It is to be noted that pushing head 132 inwardly connects knob 123 to gear 77 of the differential mechanism and that the friction between the shaft upon which knob 123 is mounted and the bearing therefor is sufficient to hold gear 77 against rotation and hence the movement of gear 73, which is intermediately driven from disk 65, will be transmitted to ground speed bar 81 and thence to radial slot lever 83 which is connected to ground speed segment 84. Through gear 86 meshed with teeth 85 on segment 84 the movement is transmitted to cable drum 54 and thence by cable 50, cable drum 49 and pinion 48 to telescope 36 which is rotated on its trunnions in such direction that the upper end thereof approaches the vertical. The positioning of roller 64 on disk 65 by means of knob 124 results in the simultaneous setting, through gears 93 and 94, shaft 95, pinion 96 and range bar 97, of index 100' on range segment 100 to indicate the range angle or dropping angle. As ground speed segment 84 continues to rotate, the notch 87 in the periphery thereof is moved toward arm 103 of the automatic release switch and as index 88 on the ground speed segment approaches alignment with index 100', the bomber lifts up on lever 110 and so moves finger 109 to permit the arm 103 to drop into notch 87 which allows spring 108 to close the automatic release switch and drop the bomb; as soon as the bomb has been launched, lever 110 is released which immediately reopens the automatic release switch.

I claim:

1. A bomb sight, comprising a sighting device mounted to be rotatable in a substantially vertical plane, means to stabilize said device with respect to the vertical, variable speed means settable so to rotate said device as to retain in the field thereof a reference object moving relatively thereto; means settable to correct the speed of said variable speed means for the trail angle of a bomb including a lever calibrated in terms of altitudes and a plate over which said lever is movable, said plate having inscribed on it curves showing the characteristics of fall of a bomb at different speeds of a craft from which the bomb is dropped, the altitude calibrations on said lever being each registrable with a point on each of said curves; means settable to correct automatically the position of said sighting device for the cross-trail of a bomb and means to stabilize all the foregoing elements in azimuth.

2. A bomb sight, comprising a sighting device mounted to be rotatable in a substantially vertical plane, means to stabilize said device with respect to the vertical, variable speed means settable so to rotate said device as to retain in the field thereof a reference object moving relatively thereto; means settable to correct the speed of said variable speed means for the trail angle of a bomb including a lever calibrated in terms of altitudes and a plate over which said lever is movable, said plate having inscribed on it curves showing the characteristics of fall of a bomb at different speeds of a craft from which the bomb is dropped, the altitude calibrations on said lever being each registrable with a point on each of said curves; and means settable to correct automatically the position of said sighting device for the cross-trail of a bomb.

3. A bomb sight, comprising a sighting device mounted to be rotatable in a substantially vertical plane, means to stabilize said device with respect to the vertical, variable speed means settable so to rotate said device as to retain in the field thereof a reference object moving relatively thereto; and means settable to correct the speed of said variable speed means for the trail angle of a bomb including a lever calibrated in terms of altitudes and a plate over which said lever is movable, said plate having inscribed on it curves showing the characteristics of fall of a bomb at different speeds of a craft from which the bomb is dropped, the altitude calibrations on said lever being each registrable with a point on each of said curves.

4. A bomb sight, comprising a sighting device mounted to be rotatable in a substantially vertical plane, means to stabilize said device with respect to the vertical; variable speed means including a disk driven at constant speed at any given altitude, a roller driven thereby and movable radially thereof to positions corresponding to different ground speeds of an air craft by which the sight is carried, means so to move said roller, said sighting device being mounted to be rotatable in a substantially vertical plane about an axis transverse to the longitudinal axis of said device, driving connections between said roller and said sighting device; means to adjust the rate at which said roller is driven to correct for the trail angle of a bomb including a lever calibrated in terms of altitudes, a plate over which said lever is movable, said plate having inscribed on it curves showing the characteristics of fall of a bomb at different speeds of a craft from which the bomb is dropped, the altitude calibrations on said lever being each registrable with a point on each of said curves, means connecting said roller to said lever whereby movement of the lever shifts said roller on said disk; means including a vertically disposed spindle to support all the foregoing elements; and means to change automatically the position of said sighting device to correct for the cross-trail of a bomb including a yoke mounted to slide transversely of the plane of rotation of the sighting device and having a slotted base, the slot in said base being disposed above the longitudinal axis of said spindle, a stud disposed in said slot and mounted to be slidable transversely of the said spindle axis, means so to slide said stud proportionally to the cross-trail of a bomb, a rockable shaft, an arm connected at one end to said shaft and having at the other end a ball disposed in said yoke, a second arm connected to said shaft and means connecting said second arm to the sighting device.

5. A bomb sight, comprising a sighting device mounted to be rotatable about an axis transverse to the longitudinal axis of the device, means to rotate said device about said transverse axis at a rate that is a function of the altitude and ground speed of a craft upon which the sight is carried, a vertical spindle by which the foregoing elements are supported; and means to shift the orientation of said transverse axis to correct for the cross trail of a bomb including a yoke mounted to slide transversely of the plane of rotation of the sighting device and having a slotted base, the slot in said base being disposed above the longitudinal axis of said spindle, a stud disposed in said slot and mounted to be slidable transversely of said spindle axis, means including an element calibrated in degrees to slide said stud proportionally to the cross-trail of a bomb, a rockably mounted shaft, an arm connected at one end to said shaft and having at the other end a ball disposed in said yoke, a second arm connected to said shaft and means connecting said second arm to said sighting device.

6. A bomb sight, comprising a casing, an axially bored spindle upon which said casing is mounted, a cardan journalled in said casing, a cradle journalled in said cardan and lying transversely thereof, a sighting device mounted in said cradle to rotate in a plane that includes the journals of the cradle, a gyro mounted in said cardan and connected to said device to stabilize said device vertically, a stem disposed in the bore of said spindle, said stem having at one end an elongated head lying with its greatest dimension transversely of the casing, an upstanding stud operatively connected to said head to slide longitudinally thereof, a strap operatively connected to said stud, means including an element calibrated in degrees of cross-trail of a bomb to move said strap and adjust the position of said stud proportionally to such cross-trail, a yoke mounted to be slidable longitudinally of said casing and having in its base a slot in which said stud is slidable, a rockably mounted shaft, an arm connected at one end to said shaft and having at its other end a ball that is disposed in said yoke, a second arm connected to said shaft and means connecting said second arm to said cradle.

7. A bomb sight, comprising a casing, an axially bored spindle upon which said casing is mounted, a cardan journalled in said casing, a cradle journalled in said cardan and lying transversely thereof, a sighting device mounted in said cradle to rotate in a plane that includes the journals of the cradle, a gyro mounted in said cardan and connected to said device to stabilize said device vertically, means associated with and settable eccentrically of said spindle proportionally to the cross-trail of a bomb, a yoke connected to said member to be slid thereby longitudinally of said case when said member is eccentrically positioned and the casing is rotated about the axis of the spindle, and a system including lever arms and links connecting said yoke to the cradle to rock said cradle and change the plane of rotation of said sighting device when said casing is rotated about the axis of the spindle while the said member is eccentrically positioned.

8. A bomb sight, comprising a casing, an axially bored spindle upon which said casing is mounted, a cardan journalled in said casing, a cradle journalled in said cardan and lying transversely thereof, a sighting device mounted in said cradle to rotate in a plane that includes the journals of the cradle, a gyro mounted in said cardan and connected to said device to stabilize said device vertically, means associated with and settable eccentrically of said spindle proportionally to the cross-trail of a bomb, and means connecting said member to said sighting device to shift the plane of rotation of said device proportionally to the eccentricity of said member when said casing is rotated about the axis of the spindle while said member is eccentrically positioned.

9. A bomb sight, comprising a sighting device rotatable about an axis transverse to the longitudinal axis thereof, mechanism so to rotate said device at a rate that is a function of the altitude of the axis of such rotation and of the speed thereof with respect to the ground, means to change the said rate to correct for the trail of a bomb whereof the angle of dropping is controlled by said device and means to shift the plane of rotation of said device with respect to the other elements of the sight to correct for the cross-trail of such bomb.

10. A bomb sight, comprising a rotatably mounted sighting device; mechanism to rotate said device including a rotatable disk, means to adjust the speed of rotation of said disk inversely proportionally to altitude, a roller driven by said disk, means to set the position of said roller on said disk proportionally to ground speed, a member whereof the position is determined by the last mentioned means, ground speed indicating means including a drum connected to and actuated by said member and an index to define the point on said drum at which the ground speed is to be read.

11. A bomb sight, comprising a rotatably mounted sighting device; mechanism to rotate said device including a rotatable disk, means to adjust the speed of rotation of said disk inversely proportionally to altitude, a roller driven by said disk, means to set the position of said roller on said disk proportionally to ground speed, a member whereof the position is determined by the last mentioned means, said member having on it a toothed rack, a pinion meshed with said rack, a ground speed indicating drum connected to said pinion and an index to define the point on said drum at which the ground speed is to be read.

12. A bomb sight, comprising a rotatably mounted sighting device; mechanism to rotate said device including a rotatable disk, means to adjust the speed of rotation of said disk inversely proportionally to altitude, a roller driven by said disk, means to set the position of said roller on said disk proportionally to ground speed, a member whereof the position is determined by the last mentioned means, a rotatable ground speed indicating drum, a flexible cable partly wound upon and having one end attached to a portion of said drum and its other end attached to said member, resilient means tending to rotate said drum in such sense as to wind said cable thereon and an index to define the point on said drum at which the ground speed is to be read.

13. The combination with a bomb sight having a sighting device and supporting means therefor including a spindle, of a sleeve in which said spindle is rotatably mounted, a gear having an elongated hub rotatably mounted upon said sleeve, a friction sleeve disposed on said elongated hub, an arm secured to said friction sleeve, an electrically conducting brush carried by said arm, a commutator with which said brush is in contact and over which it is movable, stops to limit the angular movement of said brush, the frictional engagement of the said friction sleeve with said elongated hub being such that said sleeve slips on said hub when the brush contacts a stop, means connecting said gear to the said supporting means to move said gear either in unison with said supporting means or relatively thereto, a scale adjacent the free end of said brush to indicate the angular position of said brush between said stops and a remote indicating instrument connected to said brush and said commutator to reproduce the positional indication of said brush.

14. The combination with a bomb sight, of means connected thereto to stabilize said sight in azimuth, comprising a gyro with its spin axis normally horizontal, a cardan in which said gyro is pivotally mounted, a commutator mounted on said cardan having a neutral insulating segment and on each side thereof two conducting segments, the segments on each side of the neutral segment being separated by insulating material, means energizable by current through said commutator to precess said gyro, the sense of such precession depending upon which side of said neutral segment the conducting segment in the circuit is on, a resistance connected between each conducting segment next the neutral segment and said precessing means, and a brush carried by the case of said gyro in position to contact said neutral segment when the axis of the gyro is horizontal but movable to contact with a conducting segment when said gyro axis is deflected from the horizontal.

15. The combination with a bomb sight having a vertically extending supporting spindle, of means to stabilize said sight in azimuth comprising a gyro having its spin axis normally horizontal, a cardan in which said gyro is mounted, the axis of rotation of said cardan being vertical, a drum connected to said cardan to be rotated therewith, a clutch disposed around said drum having a face substantially conforming to the contour of said drum, means tending to hold said clutch in frictional engagement with said drum, means to move said clutch out of engagement with said drum against the action of said next preceding means and means operatively to connect said clutch to said spindle.

16. A bomb sight for aircraft, comprising a sighting device, a first means to stabilize said device in a vertical plane, a second means to maintain said vertical plane in a set position in azimuth regardless of changes of course of the aircraft upon which said sight is mounted, and means to engage said second means operatively with, or disengage it from, said sighting device.

17. A bomb sight for aircraft, comprising a sighting device, a first means to stabilize said device in a vertical plane, a second means to maintain said vertical plane in a set position in azimuth regardless of changes of course of the aircraft upon which said sight is mounted, means to engage said second means operatively with, or disengage it from, said sighting device, and means to effect automatic correction of said sighting device for cross-trail of a bomb.

THEODORE H. BARTH.

REFERENCES CITED

The following references are of record in the file of this patent:

UNITED STATES PATENTS

| Number | Name | Date |
|---|---|---|
| 808,270 | Arbecam | Dec. 26, 1905 |
| 1,018,150 | Adams | Feb. 20, 1912 |
| 1,710,115 | Russell | Apr. 23, 1929 |
| 1,786,059 | Fraser | Dec. 23, 1930 |
| 1,800,931 | Dugan | Apr. 14, 1931 |
| 1,936,576 | Barth | Nov. 28, 1933 |
| 2,105,147 | Inglis | Jan. 11, 1938 |
| 2,118,041 | Estoppey | May 24, 1938 |
| 2,162,698 | Chafee et al. | June 20, 1939 |
| 2,194,141 | Estoppey | Mar. 19, 1940 |
| 2,408,356 | Willard | Sept. 24, 1946 |
| 2,428,678 | Norden et al. | Oct. 7, 1946 |
| 2,438,532 | Barth | Mar. 30, 1948 |